US 6,307,638 B1

(12) United States Patent
Matsumoto

(10) Patent No.: US 6,307,638 B1
(45) Date of Patent: *Oct. 23, 2001

(54) IMAGE PROCESSING APPARATUS AND ELECTRONIC EQUIPMENT AND THEIR CONTROL METHOD

(75) Inventor: Koichi Matsumoto, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,198

(22) Filed: Mar. 7, 1997

(30) Foreign Application Priority Data

Mar. 13, 1996 (JP) .................................................. 8-055970
Feb. 25, 1997 (JP) .................................................. 9-040674

(51) Int. Cl.[7] ...................................................... B41B 1/00
(52) U.S. Cl. ......................... 358/1.12; 358/1.9; 358/1.15
(58) Field of Search ............................. 395/111; 382/252, 382/173; 358/865, 866, 1.12–1.18, 1.9, 1.2, 456, 455, 448; 347/257; 399/86

(56) References Cited

U.S. PATENT DOCUMENTS 4,734,784 * 3/1988 Tanaka .................................. 358/426
5,101,438 * 3/1992 Kanda et al. ........................ 382/176
5,363,454 * 11/1994 Udagawa et al. .................... 382/165
5,384,632 * 1/1995 Nakajima et al. ..................... 399/86
5,659,635 * 8/1997 Komatsu .............................. 382/245
5,727,135 * 3/1998 Webb et al. ......................... 395/113
5,740,335 * 4/1998 Takayanagi et al. ................ 395/109
5,748,947 * 5/1998 Fukushima .......................... 345/501
5,790,165 * 8/1998 Kuboki et al. ...................... 347/257
5,894,546 * 4/1999 Yoshida ............................. 358/1.18
6,075,927 * 6/2000 Sakai et al. ......................... 358/1.9

* cited by examiner

Primary Examiner—Bhavesh Mehta
Assistant Examiner—Ishrat Sherali
(74) Attorney, Agent, or Firm—Fitzpatrick, Cella, Harper & Scinto

(57) ABSTRACT

When an image processing apparatus having a binarizing unit for binarizing by a hardware process allows an image signal received from an electronic equipment having a binarizing unit for binarizing by a software process to be printed from a predetermined printer, it is an object to efficiently convert a multivalue image signal to a binary image signal and to print. To accomplish this object, either one of a mode to transmit the multivalue image signal to the image processing apparatus and a mode to binarize the multivalue image signal by the electronic equipment and, after that, transmit the binary image signal to the image processing apparatus is selected. In accordance with the selection result, the multivalue image signal or the binary image signal binarized by the electronic equipment is transmitted to the image processing apparatus.

23 Claims, 17 Drawing Sheets

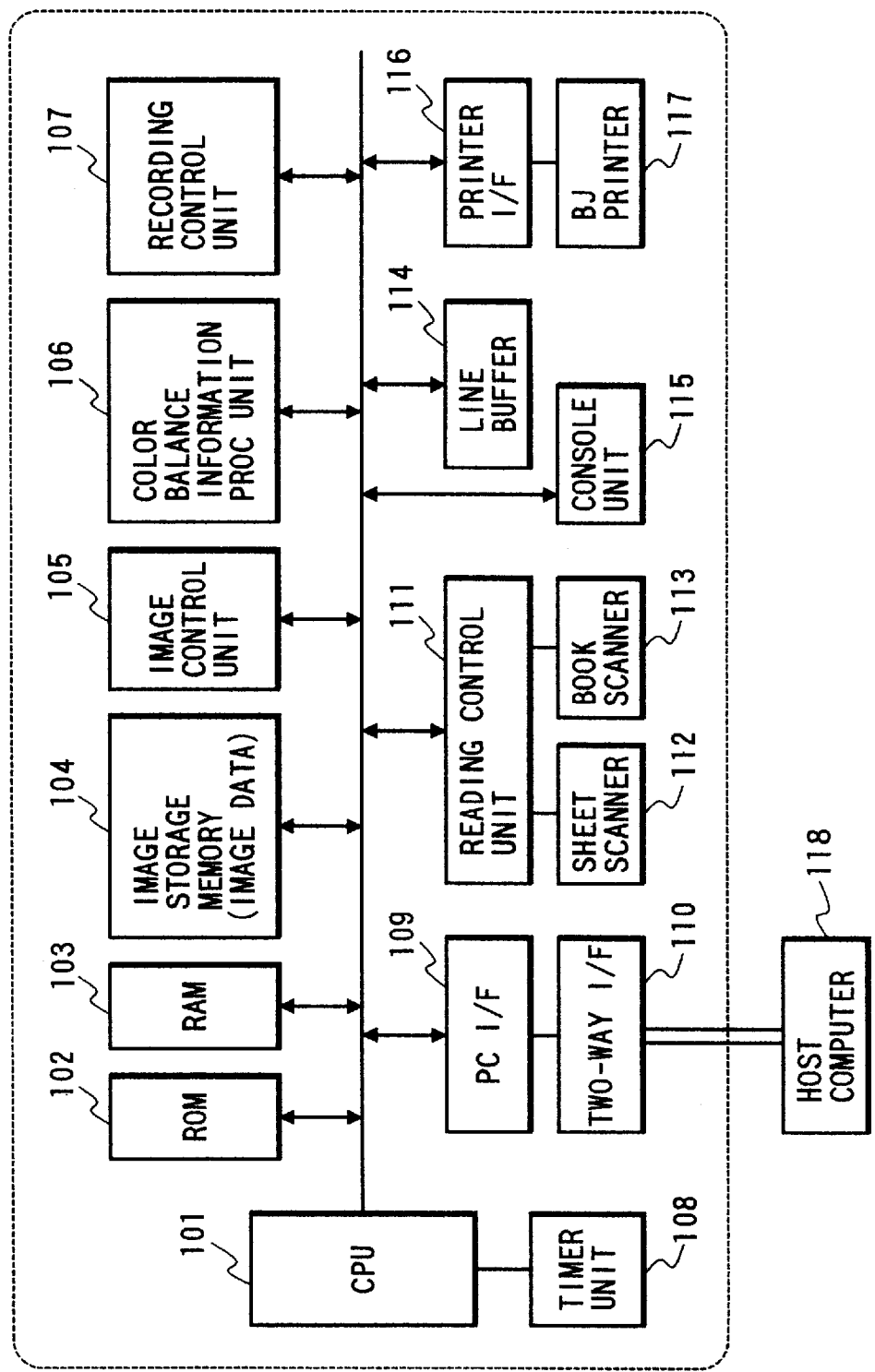

ORDINARY COPY FORMAT

BINARY IMAGE SIGNAL INPUT FORMAT

MULTIVALUE IMAGE SIGNAL INPUT FORMAT

IMAGE PROCESSING APPARATUS AND ELECTRONIC EQUIPMENT AND THEIR CONTROL METHOD

BACKGROUND OF THE INVENTION

1. Field of the Invention

The invention relates to an image processing apparatus and an electronic equipment when an image signal is transmitted from the electronic equipment and the image signal is printed by predetermined printing means through the image processing apparatus and also relates to a control method of them.

2. Related Background Art

In recent years, an image processing apparatus having a complex function in which a function as a copying apparatus and a function as a printer are simultaneously provided is known. Such an image processing apparatus has an image processing function such as a multivalue/binary conversion or the like in the image processing apparatus. However, when it operates as a printer function, a binary image signal before an image signal is received, namely, after a multivalue/binary conversion by a software process was performed on the host computer side is received and printed.

However, if the image signal is printed as mentioned above, there is a problem such that it takes a very long time until completion of the print in dependence on a performance of the host computer.

As a method of solving the above problem, as shown in FIG. 13, there is a method whereby a multivalue image signal (eight bits for each of RGB) which is transmitted from a host computer (PC) is once inputted to another hardware processing unit (IPU) and, after, the IPU performed the multivalue/binary conversion at a high speed, the signal is transmitted as a binary image signal (one bit for each of CMYKY to an image processing apparatus having a printer function.

However, according to the solving method as mentioned above, costs and a spade to install another unit (IPU) are further necessary.

SUMMARY OF THE INVENTION

The invention is made in consideration of the above prior art and it is an object of the invention that when both of an electronic equipment such as a host computer or the like and an image processing apparatus such as a printer or the like have a multivalue/binary conversion, a multivalue image signal which the electronic equipment has is efficiently converted to a binary image signal and printed.

To accomplish the above object, according to a preferred embodiment of the invention, there is provided an image processing apparatus for receiving an image signal from an external apparatus having binarizing means for binarizing a multivalue image signal by a software process, comprising: receiving means for selectively receiving the multivalue image signal or binary image signal from the external apparatus; binarizing means for binarizing the multivalue image signal received by the receiving means and outputting the binary image signal; and output means for outputting the binary image signal received by the receiving means or the binary image signal outputted by the binarizing means to predetermined printing means.

To accomplish the above object, according to another embodiment of the invention, there is also provided an electronic equipment for transmitting an image signal to a predetermined printing device having binarizing means for binarizing by a hardware process, comprising: generating means for generating a multivalue image signal; selecting means for selecting either one of a mode to transmit a binary image signal obtained by binarizing the multivalue image signal to the predetermined printing device and a mode to transmit the multivalue image signal to the predetermined printing device; binarizing means for binarizing the multivalue image signal by a software process and outputting a binary image signal; and transmitting means for transmitting the multivalue image signal or the binary image signal outputted by the binarizing means to the predetermined printing device in accordance with the result selected by the selecting means.

The above and other objects and features of the present invention will become apparent from the following detailed description and the appended claims with reference to the accompanying drawings.

BRIEF DESCRIPTION OF THE DRAWINGS

FIG. 1 is a block diagram showing a construction of an image processing apparatus according to an embodiment of the invention;

Figure 2A:
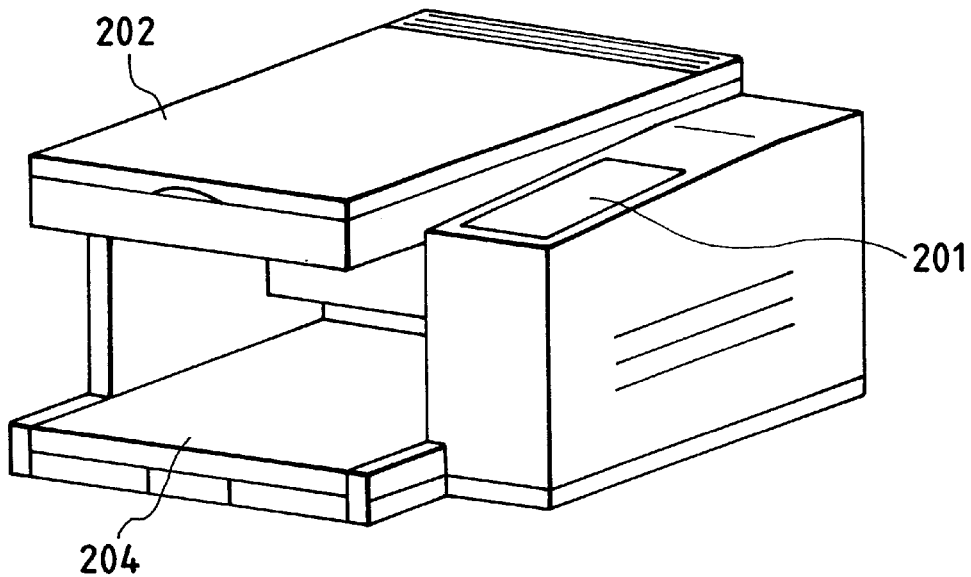
FIGS. 2A and 2B are external views of the image processing apparatus.

DETAILED DESCRIPTION OF THE PREFERRED EMBODIMENTS (First Embodiment)

FIG. 1 is a block diagram showing a construction of an image processing apparatus according to the first embodiment of the invention.

In the diagram, a CPU 101 is a system control unit to control the whole apparatus. An ROM 102 stores a control program of the CPU 101. An RAM 103 is constructed by an SRAM or the like and stores program control variables or the like. Set values registered by the operator, management data or the like of the apparatus, and various buffers for working are also stored into the RAM 103. An image memory 104 is constructed by a DRAM or the like and is used to store image data. An image control unit 105 executes an edge emphasis, a luminance/density conversion, a multivalue/binary conversion, or the like. A color balance information processing unit 106 executes a density correction and a color balance adjustment of reading/recording. A recording control unit 107 converts binary information to a native command for recording. A timer unit 108 measures an operation interval or the like and is constructed by a timer IC or the like.

A PC interface unit (PC I/F) 109 controls a two-way I/F 110 and controls transmission and reception of information to/from an external host computer 118. A sheet scanner 112 and a book scanner 113 are constructed by a CS or CCD image sensor, an original conveying mechanism, and the like and optically read an original and convert to electric image data. A reading control unit 111 performs a gamma process and a position correcting process to the image data and outputs high accurate image data. A console unit 115 is constructed by a keyboard or the like and is used for the operator to execute various inputting operations. A line buffer 114 is used when performing a transfer control of the image data. A printer 117 is an ink jet printer for recording a reception image or file data as a binary image onto an ordinary paper. In the embodiment, a bubble jet printer (hereinafter, simply referred to as a BJ printer) as one of the ink jet printers is used. When file data from a personal computer or the like is printed, a printer I/F 116 analyzes a printer description language or forms a printer description language and converts into the image data.

Figure 2B:
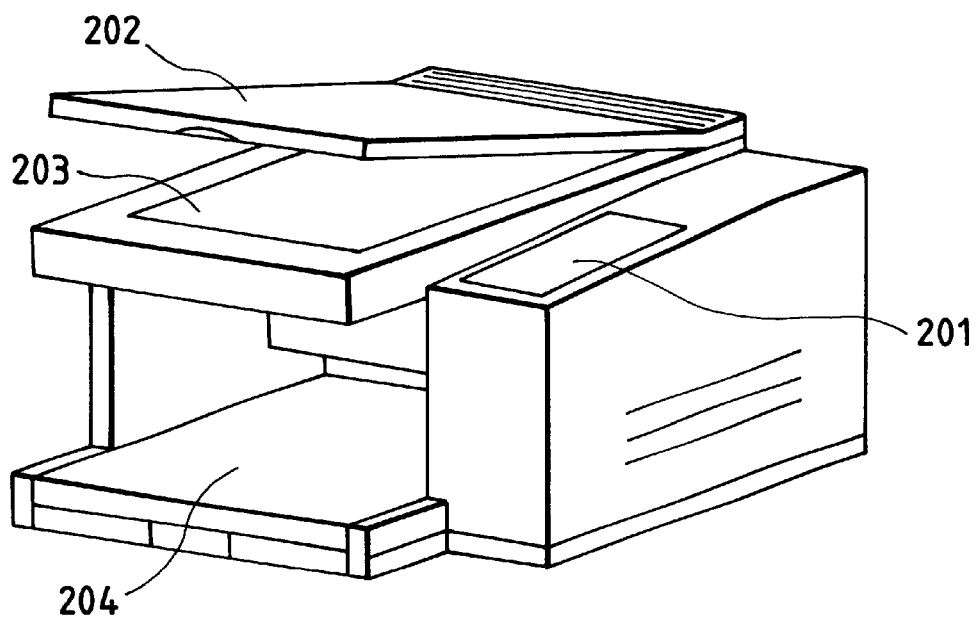

FIGS. 2A and 2B are external views of the image processing apparatus according to the invention.

In FIGS. 2A and 2B, a console unit 201 includes the console unit 115 in FIG. 1 and has display means for instructing the operation or showing a state. A reading cover unit 202 which is also used as a book original pressing cover can be replaced to a cover unit with an ADF mechanism. The originals are set upside down on a book reading original holding base plate 203. Recording papers are set in a recording paper holder 204.

Figure 3:
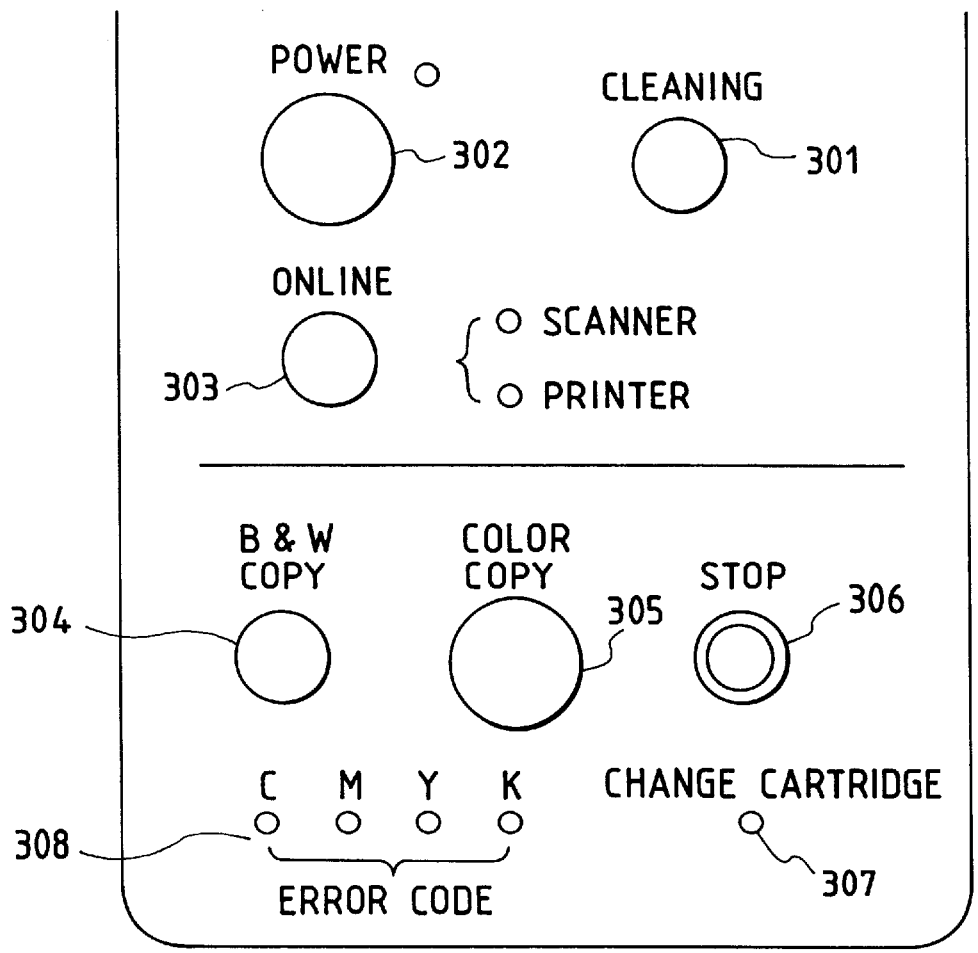
FIG. 3 is a constructional diagram showing a console unit of the image processing apparatus.

FIG. 3 shows the console unit 201.

The console unit 201 has: a cleaning key 301 for cleaning a BJ ink head of a recording unit; a secondary side power key 302 for allowing a recovery operation or the like of the recording unit to be executed; an online key 303 for enabling the reading unit/recording unit to be made operative by a host computer; a start key 304 for instructing the start of a black and white copy process; a start key 305 to instruct the start of a color copy process; a stop key 306 to instruct an interruption of the operation; a display unit 307 to promote the user to replace an ink cartridge of the recording unit; and a display unit 308 for promoting a replacement of a cartridge of each color (cyan, magenta, yellow, black) of the recording unit or expressing an error code when the operation is finished as an error.

Figure 4:
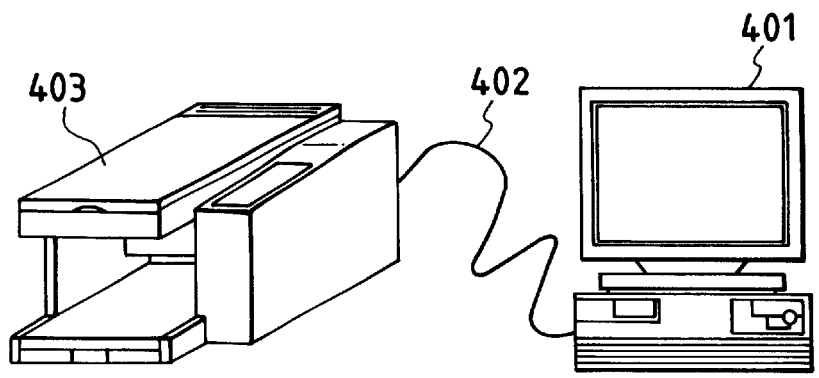
FIG. 4 is an external view showing a connection between the image processing apparatus and a host computer.

FIG. 4 is a diagram showing a connecting state between the image processing apparatus and the host computer according to the invention.

As shown in the diagram, an image processing apparatus 403 is connected by a host computer 401 and a two-way interface cable 402.

Figure 5:
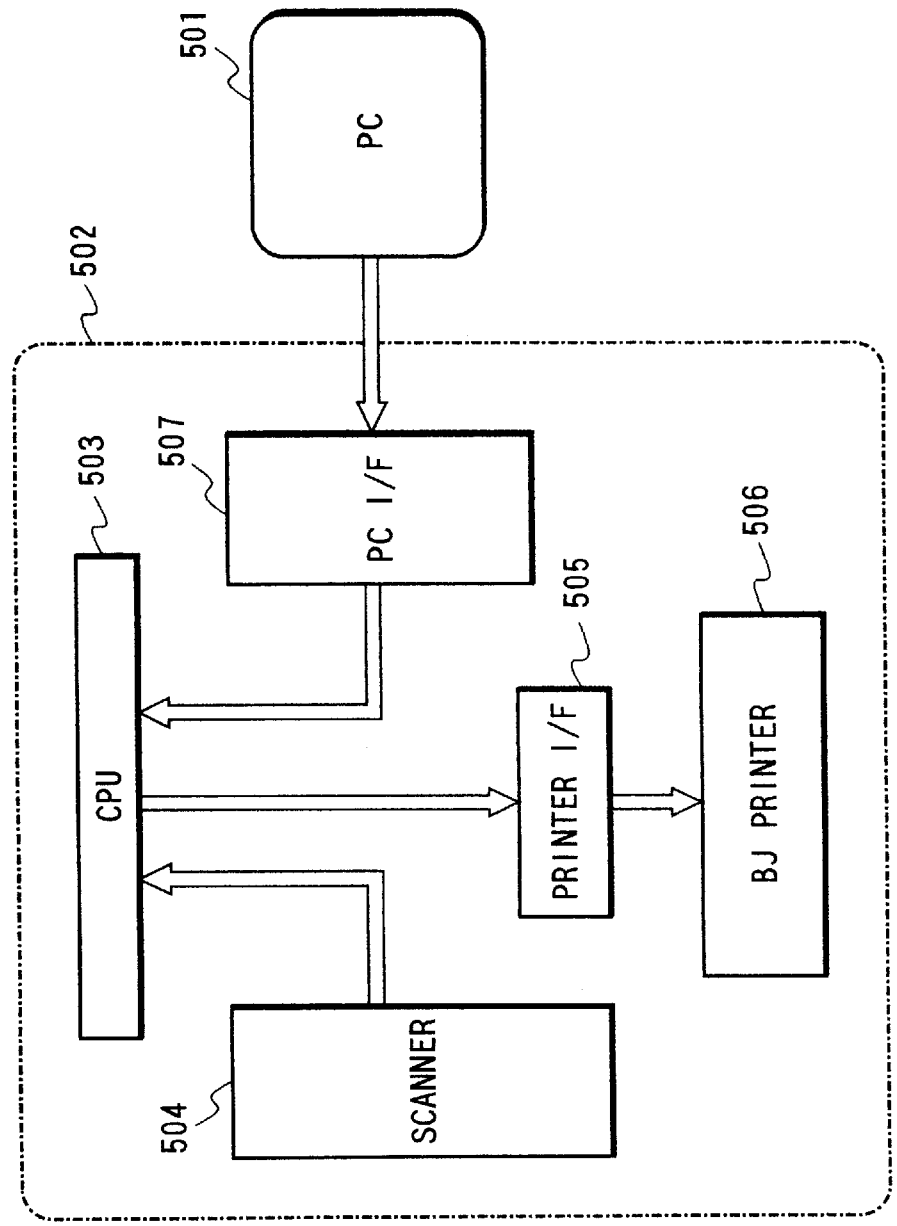
FIG. 5 is a block diagram showing a schematic control of the image processing apparatus.

FIG. 5 is a schematic control diagram of the image processing apparatus according to the invention.

In the ordinary copy mode, an image is read by a scanner 504 (corresponding to 111 to 113 in FIG. 1) in an image processing apparatus 502 (corresponding to a block surrounded by a broken line in FIG. 1), an image process is executed by a central processing unit (CPU) 503 (corresponding to 101 to 106 in FIG. 1), and after that, the processed image signal is transmitted via a printer I/F 505 (corresponding to 116 in FIG. 1) and an image is printed by a printer 506 (corresponding to 117 in FIG. 1) to execute a recording process.

When a printing process is activated by an external host computer 501 (corresponding to 118 in FIG. 1), the image information is transmitted from the host computer 501 to the image processing apparatus 502 through a personal computer interface (PC I/F) 507. After that, an image process is performed by the CPU 503 in a manner similar to the above ordinary copy process. Subsequently, the processed image signal is transmitted via the printer I/F 505 and an image is printed by the printer 506 for performing a recording process.

Figure 6:
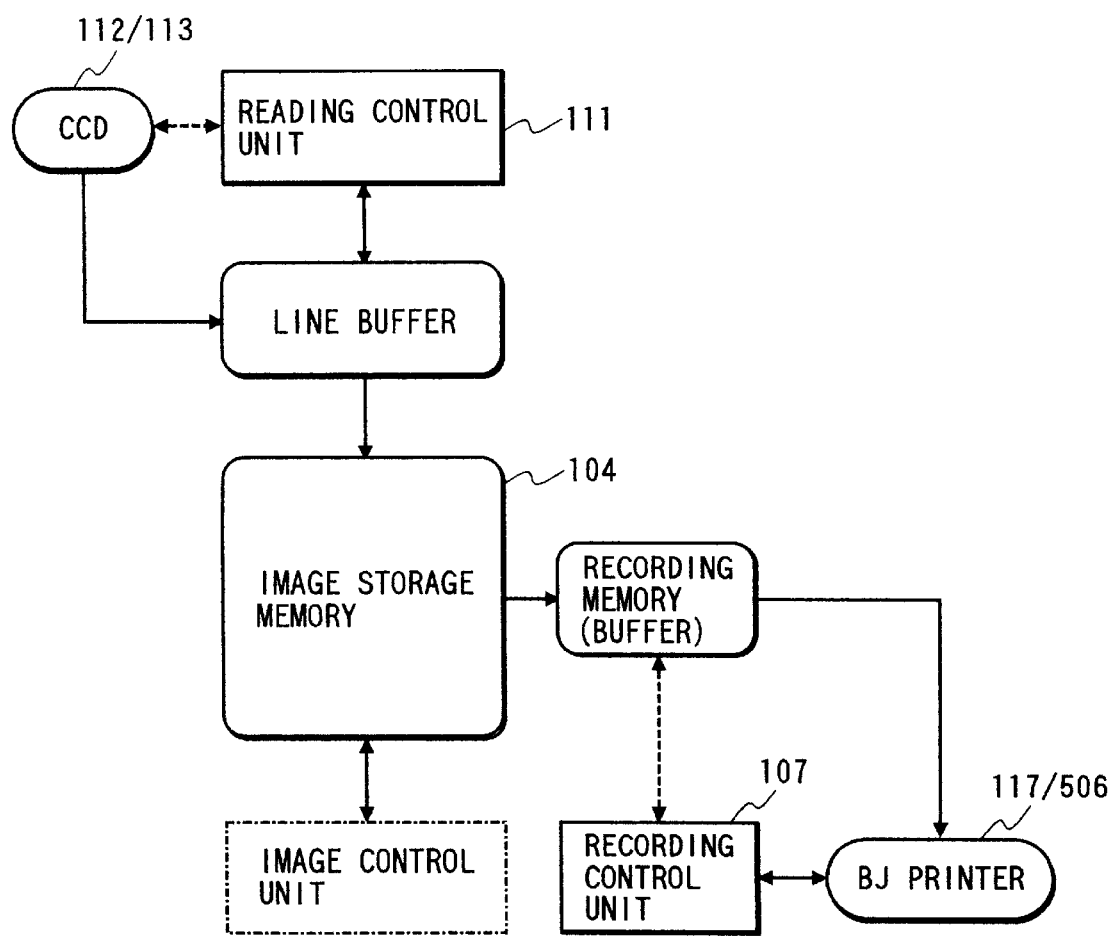
FIG. 6 is a block diagram showing a control/data flow in an ordinary stand-alone copy.

FIG. 6 is a diagram for a control/data flow in case of performing an ordinary stand-alone copy in the image processing apparatus in the embodiment.

Figure 7:
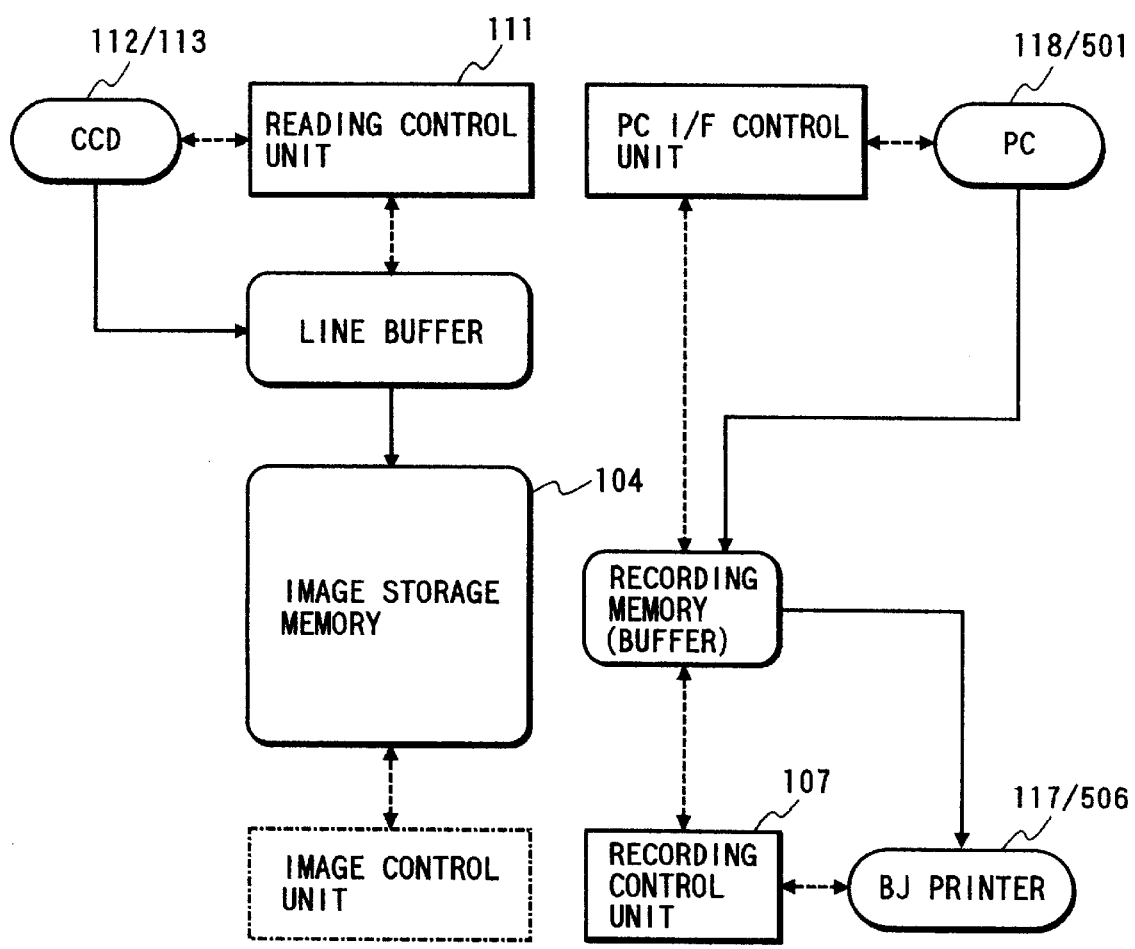
FIG. 7 is a block diagram showing a control/data flow of the image processing apparatus when a binary signal is inputted from the host computer.

FIG. 7 is an explanatory diagram for a control/data flow of the image processing apparatus in the case where the image processing apparatus receives a binary image signal from the host computer.

Figure 8:
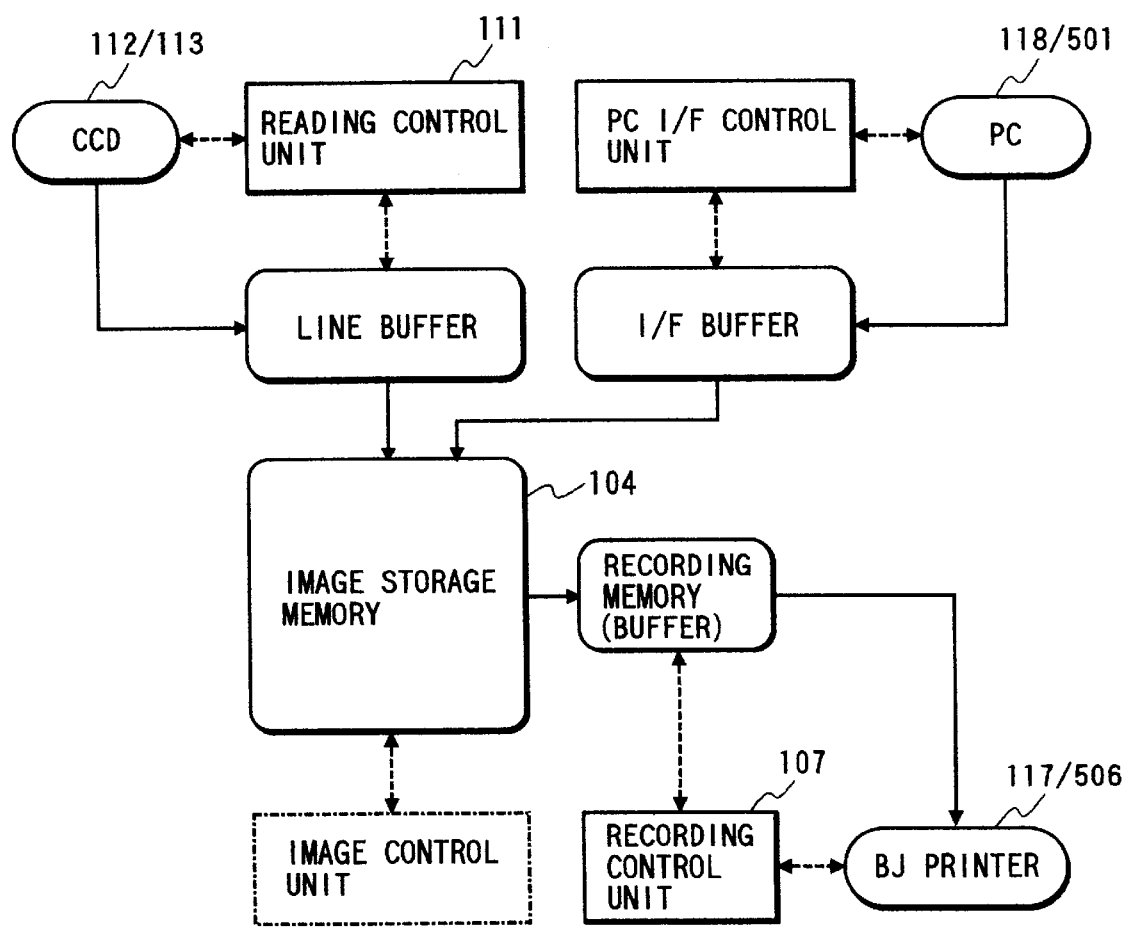
FIG. 8 is a block diagram showing a control/data flow of the image processing apparatus which enables a multivalue input from the host computer.

FIG. 8 is an explanatory diagram for a control/data flow of the image processing apparatus in the case where the image processing apparatus receives a multivalue image signal from the host computer.

As shown in FIG. 6, in case of the ordinary copy mode, multivalue image data (for example, eight bits for each of R, G, and B) which was controlled by the reading control unit 111 and was read by a CCD of the scanner 112 or 113 is stored into an image storage memory 104 and the foregoing image process is executed in the image control unit 105. In a printing mode, the image data which was image processed by the recording control processing unit 107 is transferred into the recording memory in the recording control unit 107. After that, an image is printed by the BJ printer (117 or 506).

As shown in FIG. 7, in case of receiving the binary image signal from the host computer PC (118 or 501), the PC I/F receives the control of the personal computer (PC), the image data is directly transferred into the recording memory of the image processing apparatus, and an image is printed by the BJ printer under a control of the recording control unit 107.

In case of receiving a multivalue image signal from the host computer as shown in FIG. 8, the image data from the PC is transferred to the image memory of the image processing apparatus through the I/F buffer. After that, processes are executed in accordance with a procedure similar to that in case of the ordinary copy in FIG. 6 and an image is printed.

The operation will now be described in detail with reference to control flowcharts of FIGS. 9 to 12.

Figure 9:
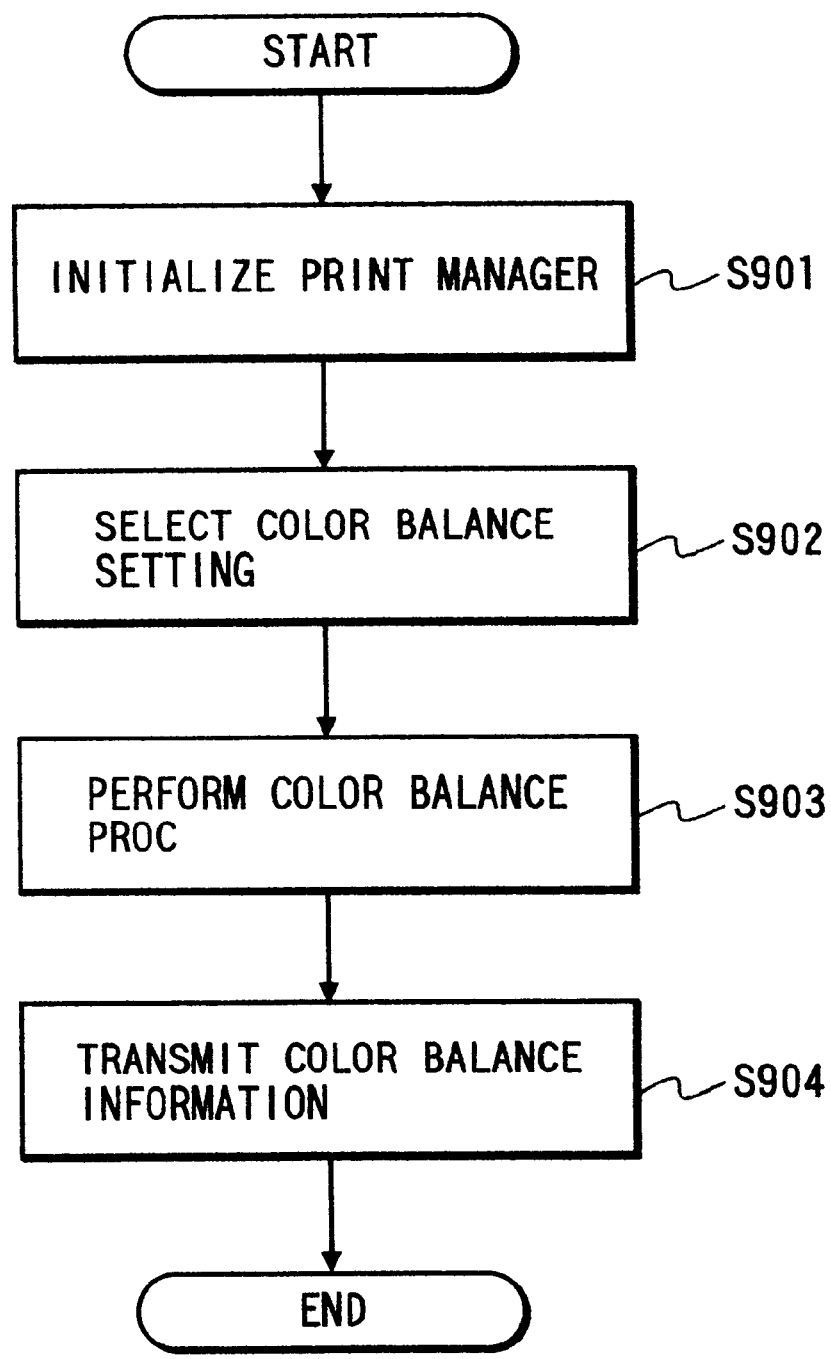
FIG. 9 is a flowchart showing the operation of the image processing apparatus.

FIG. 9 is a flowchart for a color balance setting process on the host computer PC side.

In the host computer, after a print manager was initialized in step S901 (hereinafter, a word "step" is omitted), a color balance setting is selected in S902. In S903, color balance information is formed on the basis of display color information of a CRT or the like as a display and color information of a print output of the image processing apparatus for recording. In S904, the formed color balance information is transmitted to the image processing apparatus.

Figure 10:
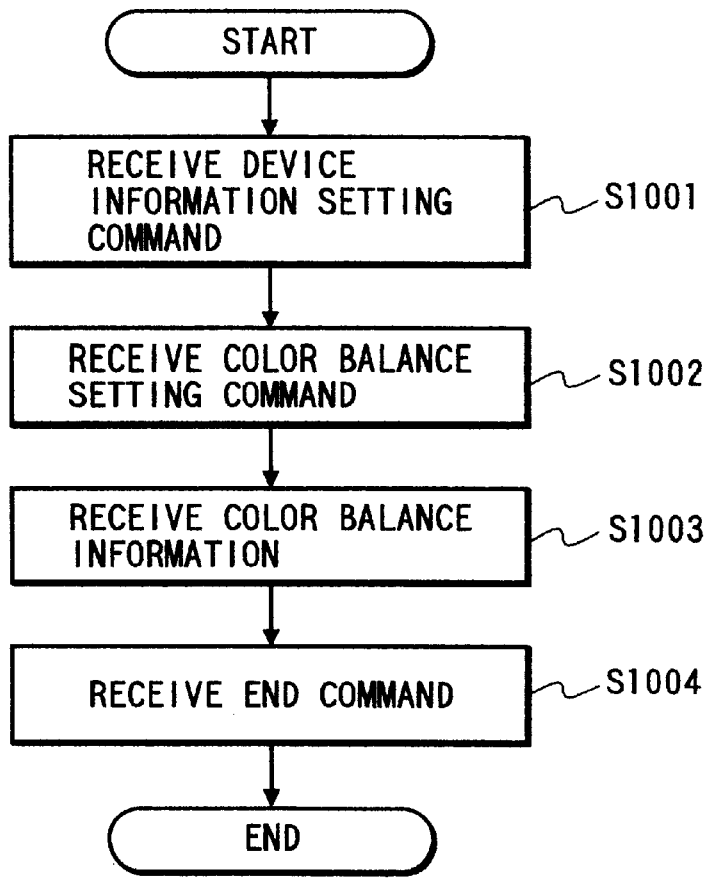
FIG. 10 is a flowchart showing the operation of the image processing apparatus.

FIG. 10 is a flowchart for a color balance receiving process of the image processing apparatus.

To receive the color balance information which is sent from the host computer, device information setting command is first received in S1001. After that, a color balance setting command is received in S1002. In S1003, the color balance information is received to the I/F buffer via the PC I/F. Finally in S1004, an end command is received and the processing routine is finished.

Figure 11:
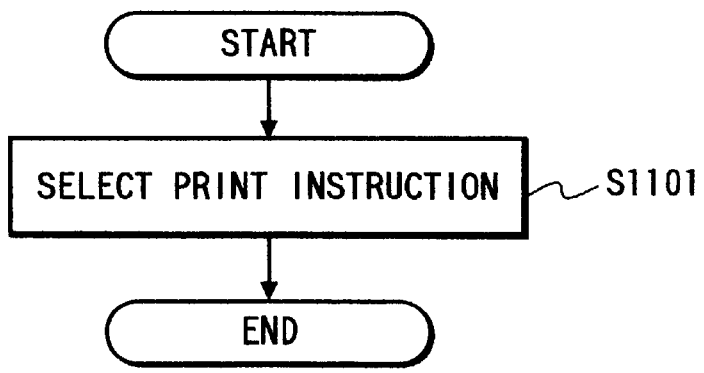
FIG. 11 is a flowchart showing the operation of the image processing apparatus.

FIG. 11 is a flowchart for a print instructing process on the host computer side.

In S1101, a print instruction of each application installed in the host computer is selected.

Figure 12:
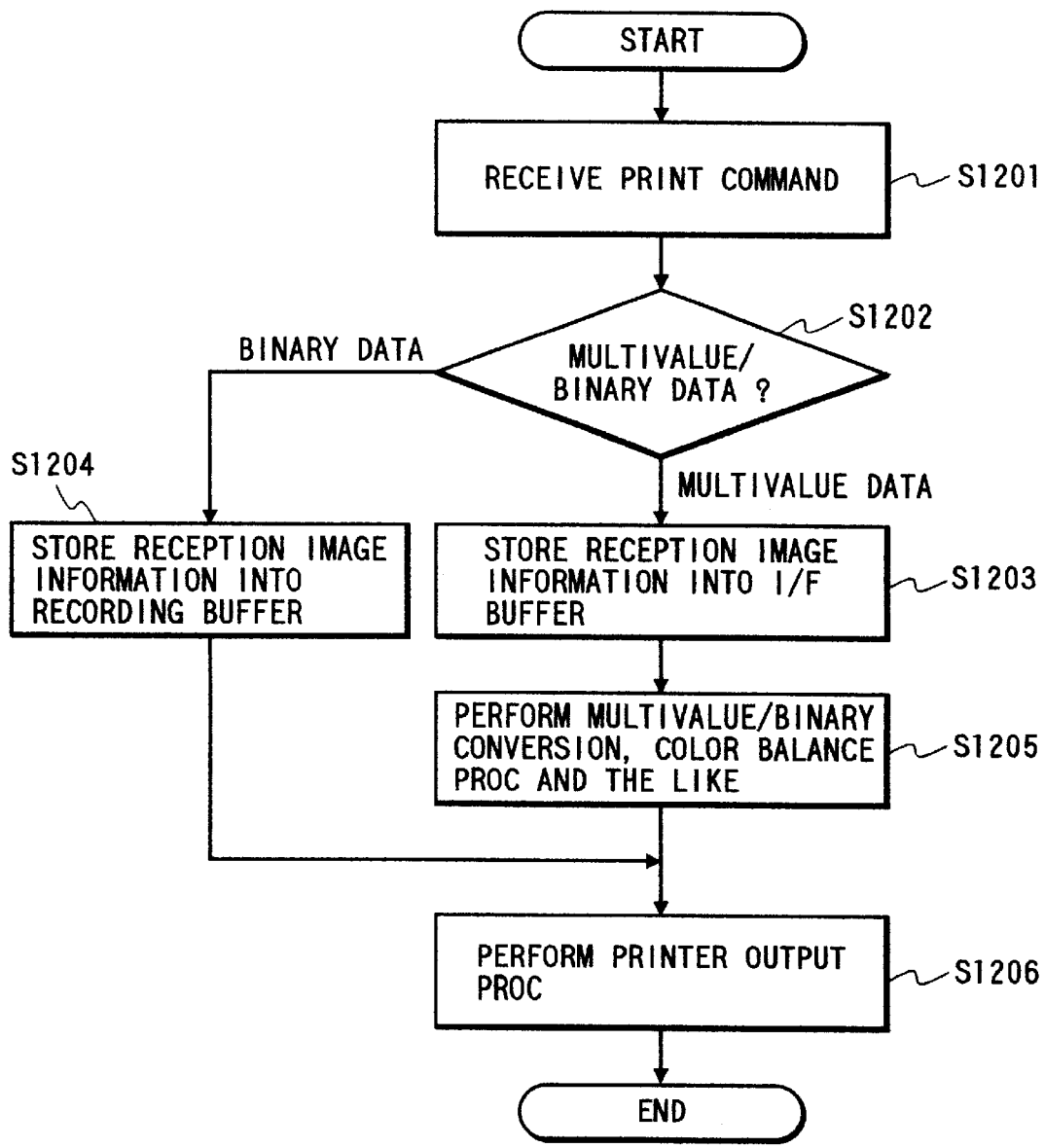
FIG. 12 is a flowchart showing the operation of the image processing apparatus.
Figure 13:
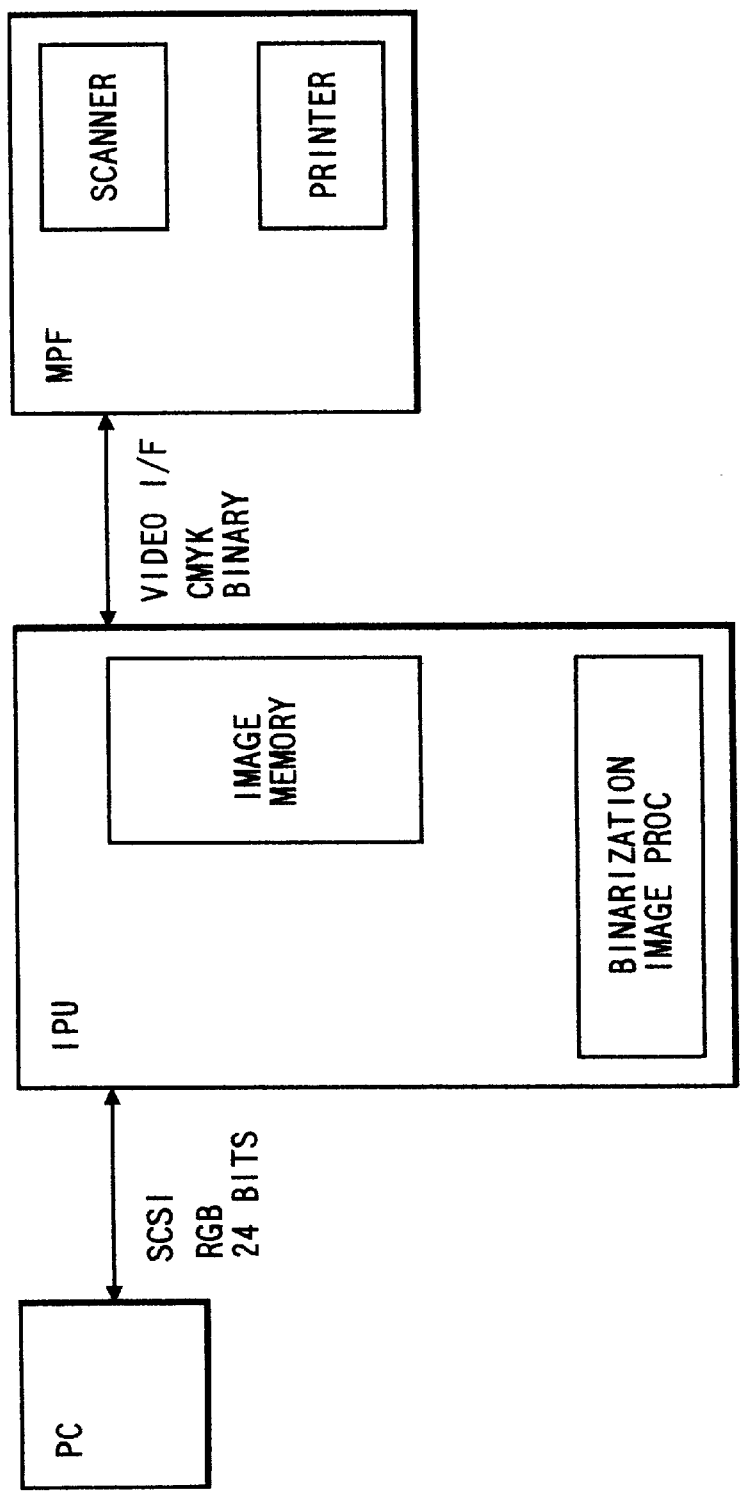
FIG. 13 is a schematic diagram of a conventional image processing system.

FIG. 12 is a flowchart showing a procedure to receive the print information of the image processing apparatus.

When a print instruction command from the host computer (118 or 501) is received in S1201, the following processing procedure is discriminated in accordance with a parameter annexed to the print instruction command, namely, a parameter to designate which one of the multivalue image signal and the binary image signal is printed in S1202. When the parameter to designate the print of a binary image is received, in S1204, the PC I/F control unit is subjected to the control from the host computer in accordance with a printing method of directly storing the binary image into the recording memory (buffer) as shown in FIG. 7, and the binary image signal is directly received by the recording memory, and the recording control unit 107 directly transmits the binary image signal received to the recording apparatus (printer 117). In S1206, the recording apparatus performs a printer output process.

In S1202, when the parameter annexed to the command is a parameter to designate the print of the multivalue image signal, in S1203, the PC I/F control unit is subjected to the control from the host computer as shown in FIG. 8, the multivalue image signal is once stored into the I/F buffer and is sequentially transmitted into the image storage memory 104 by the control (control which is executed in accordance with the line synchronization in the stand-alone copy mode) of the DMA or the like. After that, processes are performed in accordance with a procedure similar to that for the processes in the stand-alone copy mode. Namely, in S1205, before the foregoing processes are executed by the image control unit 105, a color balance process is started on the basis of the color balance information sent from the host computer. The binary image signal obtained by executing many image processes such as multivalue/binary conversion, density correction, and the like in S1205 is sent to the recording memory (buffer). After that, in S1206, the binary image signal received by the recording control unit 107 is directly transmitted to the printer 117 as a recording apparatus. The printer 117 executes a printer output process of the binary image signal.

According to the embodiment as described above, the image process such as binary/multivalue conversion or the like is not performed by the host computer to execute the software process but is executed by the image processing apparatus (complex machine having the scanner, printer, and the like) to perform the hardware process. Therefore, the image processing time does not depend on the performance of the host computer and the time which is required from the reception of the image signal to the print is stabilized. Since the hardware process instead of the software process is executed, the processing time is reduced.

As compared with a case where the device such as an IPU or the like is installed between the host computer and the image processing apparatus, since there is no need to combine and install a plurality of devices, the overall costs can be reduced and the whole space can be also reduced. Since the number of cables to connect a plurality of devices or the like can be reduced, the devices can be also easily connected.

(Second Embodiment)

The second embodiment will now be explained with respect to a case where after the multivalue image signal and binary image signal which are transmitted from the host computer in the first embodiment were compressed, the compressed signals are transmitted and the image processing apparatus can also expand the compressed signals.

Figure 14:
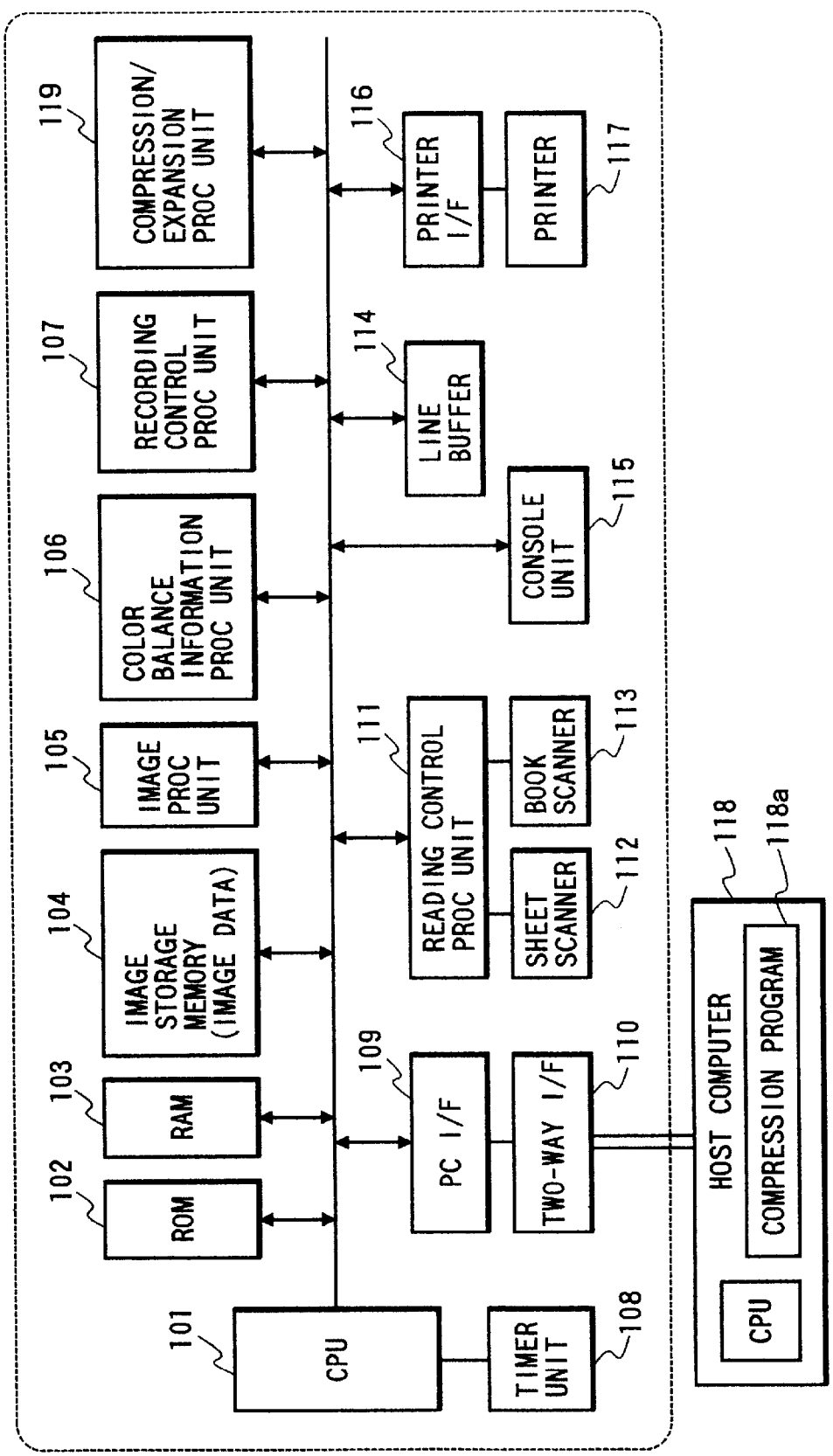
FIG. 14 is a diagram of an image processing apparatus and a host computer according to the second embodiment.

FIG. 14 is a block diagram showing a construction of the image processing apparatus in the second embodiment. Portions having functions similar to those in the first embodiment of FIG. 1 are designated by the same reference numerals. FIG. 14 largely differs from FIG. 1 with respect to a point that the apparatus has a compression/expansion processing unit 119, which will be explained hereinlater. The host computer 118 in FIG. 14 has a compression/expansion program 118*a* which can compress the binary image signal or multivalue image signal. The program operates by being controlled from a CPU existing in the host computer 118. As specific compressing/expanding methods which the compression/expansion processing unit 119 and compression/expansion program 118*a* have, JPEG and JBIG are considered as methods for the multivalue image signal and MH, MR, MMR, and JBIG are considered as methods for the binary image signal. In the description, it is assumed that any one of the above compressing/expanding methods is provided.

Figure 15:
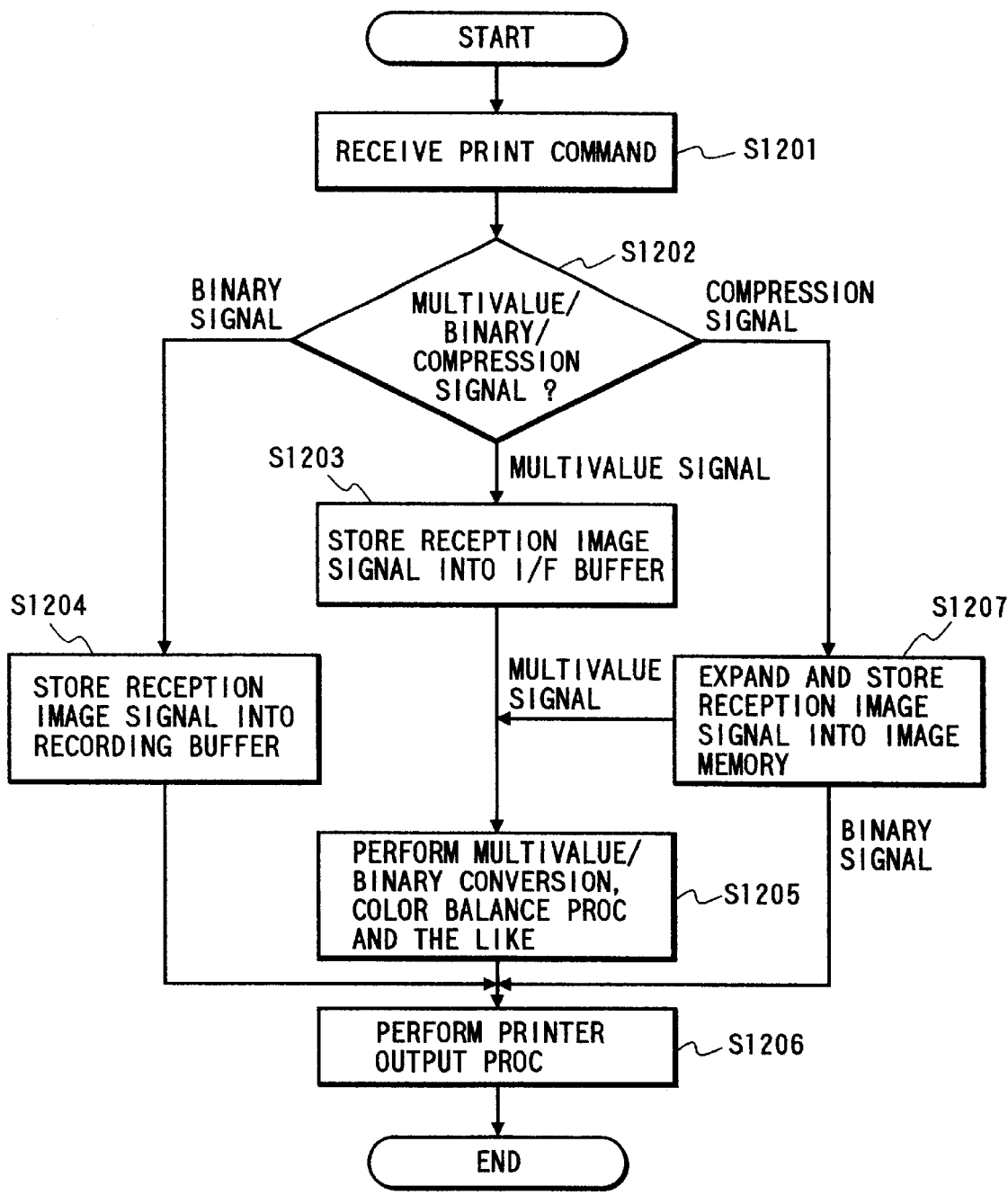
FIG. 15 is a flowchart showing a procedure for processes when an image signal is printed in the second embodiment.

The second embodiment will now be described in detail hereinbelow. FIG. 15 is a flowchart showing a procedure of processes in which the image processing apparatus selectively receives any one of the compressed multivalue image signal, non-compressed multivalue image signal, compressed binary image signal, and non-compressed binary image signal and the selected signal is printed by a predetermined printer.

In FIG. 15, the image processing apparatus receives a print instruction command from the host computer (S1201). In this instance, the image processing apparatus also receives a parameter annexed to the print instruction command. The parameter in the embodiment includes information indicating whether the signal is the multivalue signal or the binary signal and information indicating whether the signal has been compressed or not. That is, the parameter can show which one of the compressed multivalue image signal, non-compressed multivalue image signal, compressed binary image signal, and non-compressed binary image signal has been received.

In S1202, when it is determined on the basis of the parameter that the image processing apparatus has received the non-compressed binary image signal, the binary image signal is printed as it is by the BJ printer 117 by a printing method similar to that shown in FIG. 7 of the first embodiment in S1204 and S1206.

In S1202, when it is decided on the basis of the parameter that the image processing apparatus has received the non-compressed multivalue image signal, the received multivalue image signal is once stored into the I/F buffer and is stored into the image storage memory 104 by the control of the DMA or the like and, after that, processes (processes or the like such as color balance process, binary/multivalue conversion, density correction, and the like) of the same procedure as that of the stand-alone copy are executed (S1205) in a manner similar to FIG. 8 of the first embodiment. The outputted binary image signal is subsequently printed by the BJ printer 117 as a recording apparatus.

In S1202, when it is decided on the basis of the parameter that the image processing apparatus has received the compressed binary/multivalue image signal, the received image signal is expanded by the same expanding method based on the same system as that used in the compressing method of the received binary/multivalue image signal in S1207.

When the expanded image is based on the binary image signal, the binary image signal is printed as it is by the BJ printer 117 in S1206.

When the expanded image is based on the multivalue image signal, it is once stored into the image storage memory 104 in S1205. After that, the processes (processes or the like such as color balance process, binary/multivalue conversion, density correction, and the like) of the same procedure as that in the stand-alone copy are executed in a manner similar to FIG. 8 of the first embodiment. The outputted binary image signal is subsequently printed by the BJ printer 117 as a recording apparatus.

According to the embodiment as described above, since either one of the mode for directly transmitting the multivalue image signal and binary image signal to the image processing apparatus from the host computer and the mode for once compressing those signals and transmitting can be selected, the data can be efficiently transmitted in accordance with a data amount of the image signal. Since there are also a plurality of kinds of compressing methods, the image signal to be transmitted can be compressed by a method suitable for the picture quality shown by the image signal.

(Third Embodiment)

The third embodiment is characterized in that the host computer 118 in FIG. 14 in the second embodiment further has an image processing function such as a binary/multivalue conversion or the like.

Figure 16:
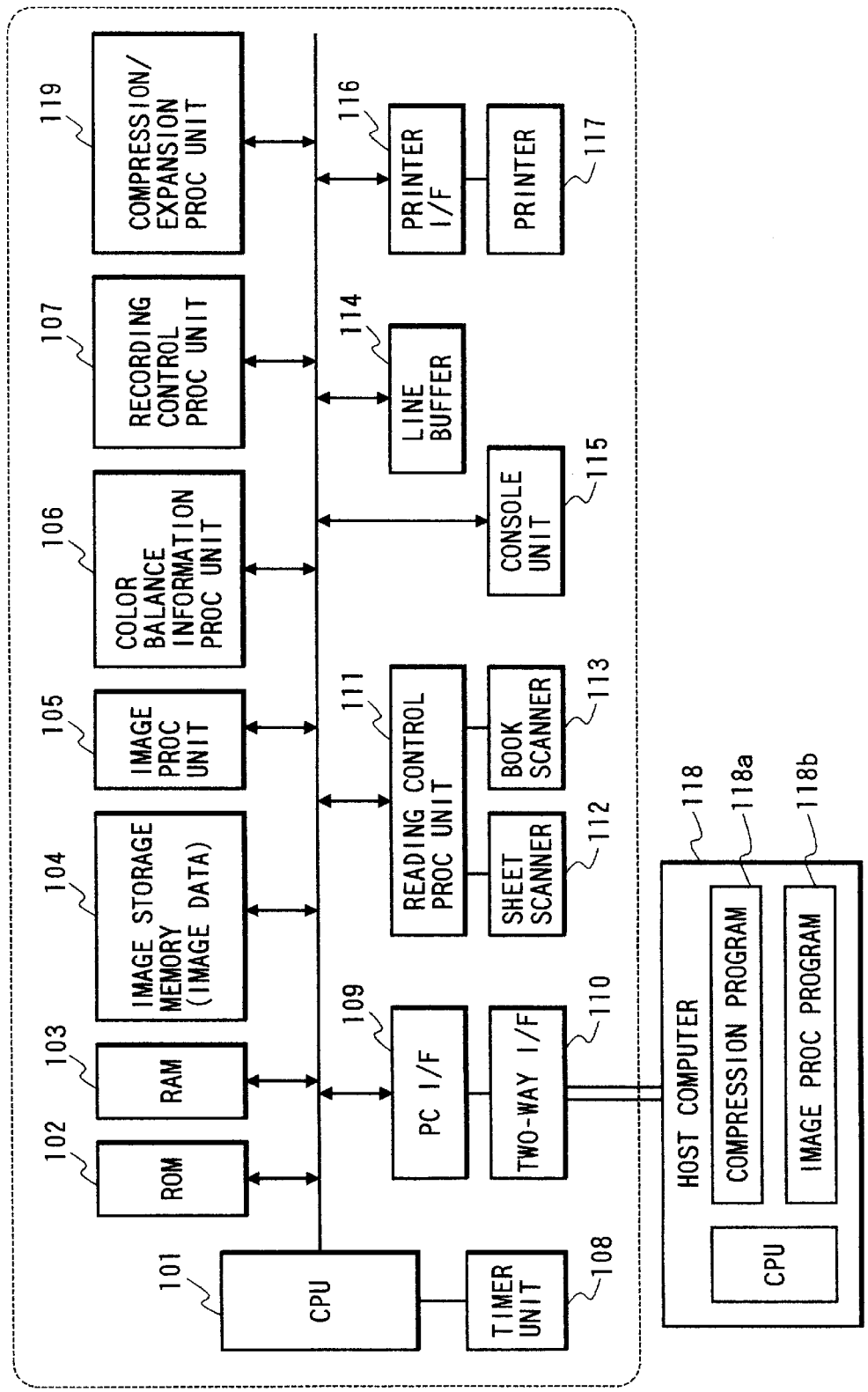
FIG. 16 is a diagram of an image processing apparatus and a host computer according to the third embodiment.

Namely, as shown in FIG. 16, the host computer 118 has an image processing program 118b for executing image processes such as color balance process, binary/multivalue conversion, density correction, and the like. The program is made operative by being controlled from a CPU existing in the host computer 118.

In the embodiment, it is assumed that the image control unit 105 in FIG. 16 executes the binary/multivalue converting process exclusively for a photograph image, specifically, carries out the binarization using a dither method.

The binary/multivalue conversion which is performed in the host computer 118 is exclusively used for a character image. Specifically, by using one threshold value, the input multivalue image signal is simply binarized. The embodiment will now be described in detail hereinbelow.

Figure 17:
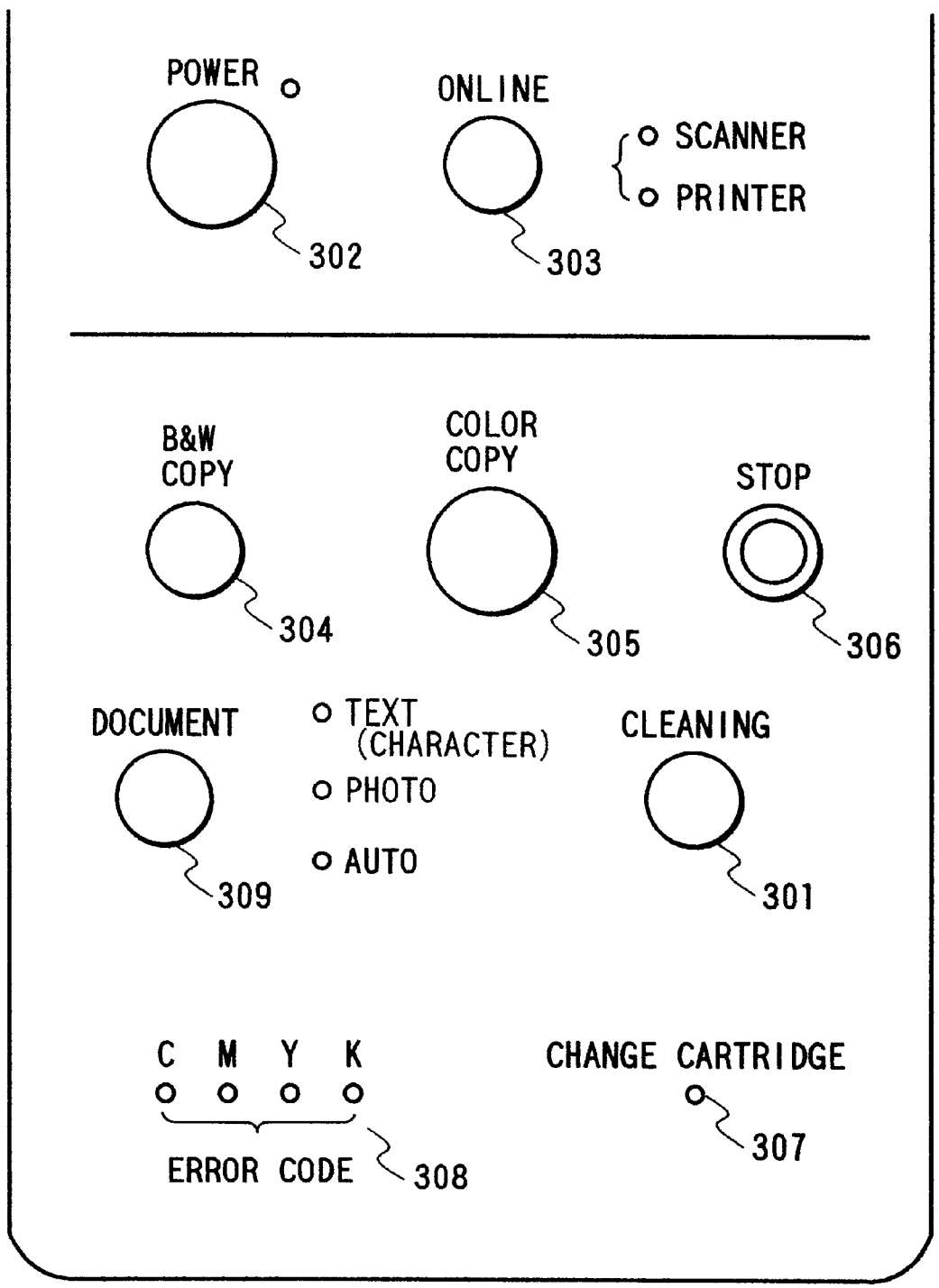
FIG. 17 is a diagram showing an example of a console unit of the image processing apparatus in the third embodiment.

FIG. 17 shows the console unit 201 in the second embodiment and differs from the first and second embodiments with respect to a point that there is provided a key 309 for manually switching three modes (hereinafter, referred to as printing modes) of a (character mode, namely, "Text" mode) for printing an original (image signal) as a character, a (photograph mode, namely, "Photo" mode) for printing an original as a photograph, and an (automatic mode, namely, "Auto" mode) for automatically discriminating whether the original has a character image or a photograph image.

By properly informing the host computer 118 of the designating state of the console unit 201, the host computer 118 can also recognize the printing mode.

Figure 18:
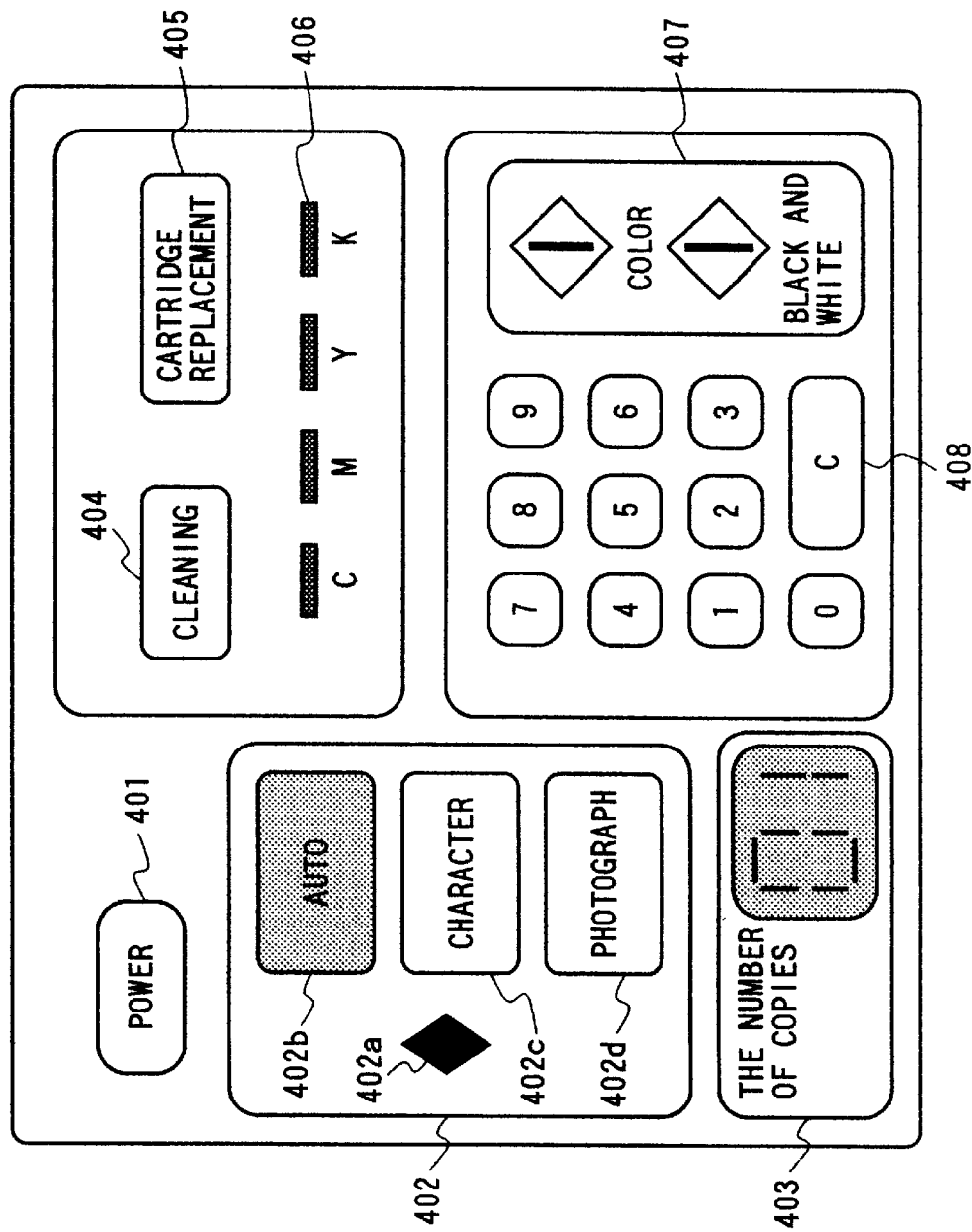
FIG. 18 is a diagram showing a display unit of the host computer in the third embodiment.

FIG. 18 is a diagram showing an example when various setting states to print the image signal are displayed in a display unit (display) existing in the host computer 118.

In FIG. 18, reference numeral 402 denotes a printing mode display unit serving as a window to display the printing mode designated from the image processing apparatus or the printing mode designated from the console unit in the host computer 118. In FIG. 18, reference numeral 402a denotes a mark indicative of the printing mode which is actually used. In this case, a state in which a print is performed in the Text mode.

Reference numerals 402b, 402c, and 402d denote marks indicating which printing mode the operator designated. The printing mode designated by the operator is displayed as an inverted state. In this case, a state in which the Auto mode was designated by the operator is shown. That is, the printing mode display unit 402 in FIG. 18 shows that the apparatus automatically selected that the image signal is printed in the Text mode in a state in which the Auto mode was designated by the operator. When the operator designates the Text mode or Photo mode, the designated printing mode (402c/402d) and the printing mode shown by the mark 402a are the same.

Since the designation of the printing mode by the operator can be performed from the image processing apparatus and the host computer, a communication to setting a common printing mode is properly performed between those apparatuses (namely, between the CPU of the image processing apparatus and the CPU of the host computer) and each CPU controls each apparatus in accordance with the printing mode.

The roles of the printing mode and the like and the procedure to print the image signal which is transmitted from the host computer 118 will now be described in detail hereinbelow.

Figure 19:
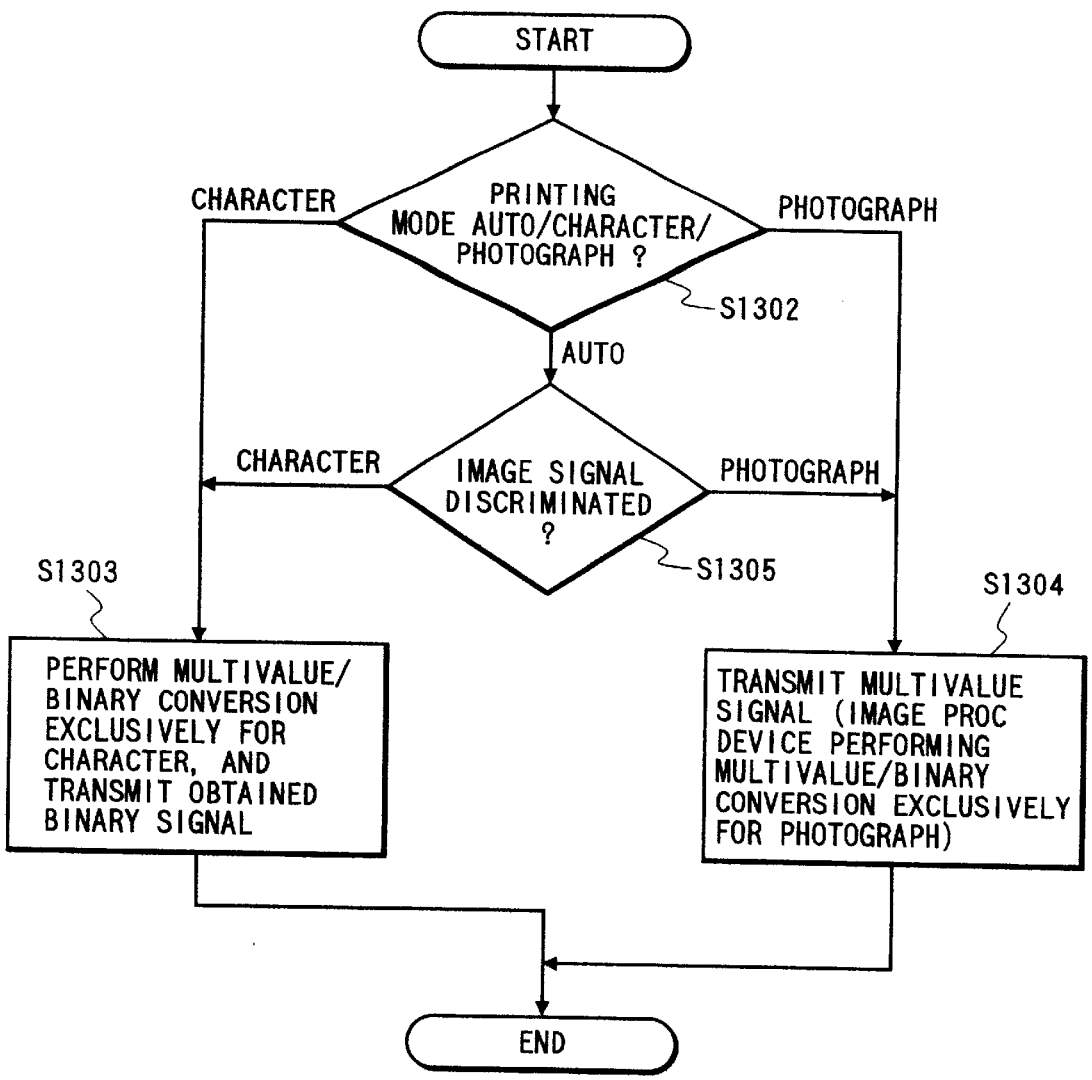
FIG. 19 is a flowchart showing a procedure for processes when an image signal is printed in the third embodiment.

FIG. 19 is a flowchart showing a procedure when the host computer 118 transmits the image signal to the image processing apparatus and prints.

When the printing operation of the image signal is started, the kind of printing mode designated by the operator is first discriminated in S1302.

When the printing mode is the Text mode, the multivalue image signal to be transmitted from the host computer 118 is converted into the binary image signal by the binary/multivalue converting process exclusively for the character image and, after that, transmits the binary image signal to the image processing apparatus.

When the image signal to be transmitted is inherently the binary image signal, it is sufficient to transmit it as it is.

The transmitted binary image signal is directly outputted from the BJ printer through the recording memory of the image processing apparatus as shown in FIG. 7.

In S1302, when the printing mode is the Photo mode, the multivalue image signal to be transmitted is transmitted as it is to the image processing apparatus in S1304.

The multivalue image signal transmitted in S1304 is subjected to the binary/multivalue conversion exclusively for the photograph image in the image control unit 105 of the image processing apparatus. The resultant binary image signal obtained is outputted from the BJ printer.

When the printing mode is the Auto mode in S1302, the kind (character or photograph) of the image signal is discriminated by using the CPU of the host computer 118 and an internal program for image discrimination in step S1305. When it is the character as a result of discrimination, a process in S1303 is performed. In case of the photograph, a process in S1304 is executed. The subsequent processes are similar to the processes for the character and photograph described above.

According to the embodiment as described above, since the binarizing method can be switched in accordance with whether the image signal to be printed is the character image signal or the photograph image signal, the binary/multivalue conversion suitable for the kind of image can be performed.

As for the binary/multivalue conversion (dither process, error diffusion, or the like) which is used in the Photo mode, the binary/multivalue conversion is executed by the hardware process on the image processing apparatus side in consideration of a point that a load on the software process is large. As for the binary/multivalue conversion (simple binarization) which is used in the Text mode, the binary/multivalue conversion can be efficiently executed by using the binary/multivalue converting function which the host computer 118 has in consideration of a point that the load on the software process is relatively small.

(Other Embodiments)

The present invention is not limited to the foregoing first to third embodiments, but various modifications of the present invention are possible on the basis of the above embodiments.

For example, in the third embodiment, the mode for performing the binary/multivalue conversion in the host computer 118 and the mode for performing the binary/multivalue conversion by the image processing apparatus are switched in accordance with whether the image signal to be transmitted from the host computer 118 is based on a character or a photograph, and whether the binary/multivalue image signal which is transmitted is compressed or not as described in the second embodiment can be also switched. With such a method, it is possible to finely set in accordance with a situation.

In the second embodiment, as a method of compressing and expanding the multivalue image signal, it is also possible to construct such that a proper method can be selected from a plurality of methods such as JPEG, JBIG, and the like. As a method of compressing and expanding the binary image signal, it is also possible to construct such that a proper method can be selected from a plurality of methods such as MH, MR, MMR, JBIG, and the like. Specifically speaking, it is assumed that as compressing/expanding methods which the compression/expansion processing unit 119 and the compression/expansion program 118*a* have, they have the methods of JPEG and JBIG for the multivalue image signal and have the methods of MH, MR, MMR, and JBIG for the binary image signal. In this case, since the binary/multivalue image signal is expanded by the expanding method based on the same system as that used in the compressing method in S1207, the image processing apparatus (compression/expansion processing unit 119) also receives information indicating which compressing method the host computer 118 (compression/expansion program 118*a*) used from the host computer 118. On the basis of such information, the image processing apparatus can select the proper expanding method. It is sufficient that such information is transmitted and received between the CPUs of both apparatuses (the host computer 118 and the image processing apparatus) at a time point when the compressing method to be used is determined.

Although the third embodiment has been described on the assumption that there are the Text mode and Photo mode as substantial printing modes excluding the Auto mode, the invention is not limited to those modes. As a printing mode of a figure or the like other than the Text mode and Photo mode, a figure mode can be also added. The binary/multivalue converting function according to the figure mode can be also added to the host computer 118 or the image control unit 105 in the image processing apparatus.

According to the third embodiment, as a method of binary/multivalue conversion, the binarization using the simple binarization is used exclusively for a character and the binarization using the dither method is used exclusively for a photograph image. However, the invention is not limited to those methods. It is also possible to construct such that the binarization using the simple binarization is used exclusively for a character, the binarization using the dither method is used exclusively for a figure image in the figure mode, and the binarization using the error diffusing method is used exclusively for a photograph image.

In the third embodiment, although the binary/multivalue converting method is allocated one by one in accordance with the kind of each image, the invention is not limited to such a method. It is also possible to construct such that whether the simple binarization or the binarization using the dither method is performed can be selected for a character image and whether the binarization using the dither method or the binarization using the error diffusing method is performed can be selected for a figure image or a photograph image.

Although the third embodiment has been described with respect to the case where the simple binarization exclusively for a character exists on the host computer 118 side and the binarization using the dither method exclusively for a photograph exists on the image processing apparatus side, the invention is not limited to such a method. It is also possible to construct such that the binarization using the dither method exclusively for a photograph exists on the host computer 118 side and the simple binarization exclusively for a character exists on the image processing apparatus side. With such a construction, there is an effect that the binarizing process exclusively for a character can be processed at a high speed.

According to the invention, when there are a plurality of binarizing methods which the binarizing processing function of either one of the host computer 118 and the image processing apparatus has, if the same binarizing method exists in both of the host computer 118 and the image processing apparatus, the image processing apparatus receives the multivalue image signal and controls so that the received multivalue image signal is binarized in the image processing apparatus (on the side which executes the hardware process). That is, the binarization of the hardware process is preferentially executed. Thus, the print processing speed can be raised as high as possible. In this instance, a communication to discriminate whether there are apparatuses such that the CPUs of both apparatuses has the same binarizing method or not is carried out. Which binarizing process the CPUs of both apparatuses have is recognized and on the basis of the recognition result, the CPUs of both apparatuses execute the foregoing control. The above communication is executed until the printing process (binarizing process) of the image signal is executed. Specifically explaining, in the third embodiment, although it is assumed that the simple binarization exists on the host computer 118 side and the binarization using the dither method exists on the image processing apparatus side, when not only the above two binarizing methods but also the binarization using, for example, the error diffusing method exists on both of the host computer 118 and the image processing apparatus, the binarization (hardware process) using the error diffusing method in the image processing apparatus is preferentially performed. Therefore, the multivalue image signal is transmitted as it is from the host computer 118 and the binarization using the error diffusing method is carried out on the image processing apparatus side.

The present invention is not limited to the foregoing embodiments but many modifications and variations are possible within the spirit and scope of the appended claims of the invention.

What is claimed is:

1. An image processing apparatus for receiving an image signal output from a host computer having binarizing means for binarizing a multivalue image signal by a software process, comprising:

receiving means for selectively receiving the multivalue image signal or a binary image signal output from said host computer;

binarizing means for binarizing the multivalue image signal received by said receiving means and outputting a binary version of this image signal; and output means for outputting the binary image signal received by said receiving means from the host computer or a binary image signal output by said binarizing means to a predetermined printing means, wherein said receiving means receives the multivalue image signal when a binarizing method by said binarizing means of said host computer and a binarizing method by said binarizing means of said image processing apparatus are the same.

2. An apparatus according to claim 1, further comprising discriminating means for discriminating whether the binarizing method by the binarizing means of said host computer and the binarizing method by the binarizing means of said image processing apparatus are the same or not.

3. An apparatus according to claim 1, wherein said binarizing means has a plurality of binarizing methods.

4. An apparatus according to claim 3, wherein said binarizing methods include a method of simply binarizing, a binarizing method using a dither method, and a binarizing method using an error diffusing method.

5. An apparatus according to claim 1, further comprising expanding means for expanding said multivalue image signal or said binary image signal when the multivalue image signal or binary image signal received by said receiving means has been compressed.

6. An apparatus according to claim 5, further comprising discriminating means for discriminating whether the multivalue image signal or binary image signal received by said receiving means has been compressed or not, and wherein said expanding means expands in accordance with a discrimination result by said discriminating means.

7. An apparatus according to claim 5, wherein said expanding means has a plurality of expanding methods and expands the binary image signal received by said receiving means by using one of said plurality of expanding methods.

8. An apparatus according to claim 5, wherein said expanding means has a plurality of expanding methods and expands the multivalue image signal received by said receiving means by using one of said plurality of expanding methods.

9. An apparatus according to claim 1, further comprising said predetermined printing means, and wherein said predetermined printing means prints the binary image signal outputted by said output means.

10. An apparatus according to claim 9, wherein said printing means is an ink jet printer for outputting the binary image signal.

11. An apparatus according to claim 1, further comprising reading means for reading an original and forming a multivalue image signal, and wherein said binarizing means binarizes the multivalue image signal formed by said reading means and outputs the binary image signal.

12. An image processing method of receiving, in an image processing apparatus, an image signal output from a host computer having binarizing means for binarizing a multivalue image signal by a software process, comprising:

a receiving step of selectively receiving, in the image processing apparatus, the multivalue image signal or a binary image signal output from said host computer;

a binarizing step of binarizing the multivalue image signal received in said receiving step by using a binarizing means in said image processing apparatus, and outputting a binary version of this image signal; and an output step of outputting the binary image signal received from said host computer in said receiving step or a binary image signal output in said binarizing step to a predetermined printing means, wherein in said receiving step the multivalue image signal is received when a binarizing method by said binarizing means of said host computer and a binarizing method by said binarizing means of said image processing apparatus are the same.

13. A host computer for transmitting an image signal to an external predetermined printing apparatus having binarizing means for binarizing by a hardware process, comprising:

generating means for generating a multivalue image signal;

selecting means for selecting a mode to transmit a binary image signal obtained by binarizing said multivalue image signal in said host computer to said predetermined printing apparatus or a mode to transmit said multivalue image signal to said predetermined printing apparatus;

binarizing means for binarizing said multivalue image signal by a software process and outputting a binary image signal;

transmitting means for transmitting said multivalue image signal or the binary image signal output by said binarizing means from said host computer to said predetermined printing apparatus in accordance with a result selected by said selecting means; and control means for controlling so that the binarization by the binarizing means of said host computer is not executed when a binarizing method of said binarizing means of said predetermined printing apparatus and a binarizing method of the binarizing means of said host computer are the same.

14. An apparatus according to claim 13, further comprising discriminating means for discriminating whether the binarizing method used by the binarizing means of said predetermined printing apparatus and the binarizing method used by the binarizing means of said host computer are the same.

15. An apparatus according to claim 13, wherein said binarizing means has a plurality of binarizing methods.

16. An apparatus according to claim 15, wherein said binarizing methods include a method of simply binarizing, a binarizing method using a dither method, and a binarizing method using an error diffusing method.

17. An apparatus according to claim 13, further comprising compressing means for compressing said multivalue image signal or said binary image signal to be transmitted by said transmitting means.

18. An apparatus according to claim 17, wherein said compressing means compresses said multivalue image signal by selectively using a plurality of compressing methods.

19. An apparatus according to claim 17, wherein said compressing means can compress said binary image signal by selectively using a plurality of compressing methods.

20. An apparatus according to claim 13, wherein said predetermined printing apparatus is an ink jet printer for outputting the binary image signal.

21. An apparatus according to claim 13, wherein the selection by said selecting means is executed in accordance with a kind of image shown by the multivalue image signal generated by said generating means.

22. An apparatus according to claim 21, wherein at least one of a character image, a figure image, and a photograph image is included in said kind of image.

23. A method of transmitting an image signal from a host computer to an external predetermined printing apparatus having binarizing means for binarizing by a hardware process, comprising:

a generating step of generating a multivalue image signal;

a selecting step of selecting a mode to transmit a binary image signal obtained by binarizing said multivalue image signal in said host computer to said predetermined printing apparatus or a mode to transmit said multivalue image signal to said predetermined printing apparatus;

a binarizing step of binarizing said multivalue image signal by a software process and outputting a binary image signal;

a transmitting step of transmitting said multivalue image signal or the binary image signal output by said binarizing step from said host computer to said predetermined printing apparatus in accordance with a result selected by said selecting step; and a controlling step of controlling so that said binarizing step is not executed when a binarizing method of said binarizing means of said predetermined printing apparatus and a binarizing method of said binarizing step are the same.

\* \* \* \* \*